(12) United States Patent
Sundararajan et al.

(10) Patent No.: US 8,650,019 B1
(45) Date of Patent: Feb. 11, 2014

(54) LINKING UNTIMED DATA-PATH AND TIMED CONTROL-PATH MODELS

(75) Inventors: Arvind Sundararajan, Sunnyvale, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 926 days.

(21) Appl. No.: 12/695,800

(22) Filed: Jan. 28, 2010

(51) Int. Cl.
*G06F 17/50* (2006.01)
(52) U.S. Cl.
USPC ............................................. 703/14; 703/13
(58) Field of Classification Search
None
See application file for complete search history.

(56) References Cited

U.S. PATENT DOCUMENTS

| | | | | |
|---|---|---|---|---|
| 7,684,968 B1 * | 3/2010 | Szedo et al. | ..................... | 703/14 |
| 7,778,815 B2 * | 8/2010 | Pasricha et al. | ................. | 703/22 |
| 8,079,013 B1 * | 12/2011 | Ma et al. | ........................ | 716/139 |
| 2008/0263486 A1 * | 10/2008 | Alexanian et al. | ................. | 716/5 |
| 2010/0198574 A1 * | 8/2010 | Veller | .............................. | 703/14 |

OTHER PUBLICATIONS

Cornet et al., "A Method for the Efficient Development of Timed and Untimed Transaction-Level Models of Systems-on-Chip", Design, Automation and Test in Europe, Mar. 2008, pp. 9-14.*

* cited by examiner

*Primary Examiner* — Omar Fernandez Rivas
*Assistant Examiner* — Herng-Der Day
(74) *Attorney, Agent, or Firm* — LeRoy D. Maunu; Lois D. Cartier

(57) ABSTRACT

Approaches for creating a timed hybrid simulation model for a circuit design specification. An untimed, high-level language (HLL) data-path model is input, along with an HLL data-path interface specification that specifies input ports of the HLL data-path model. A hardware description language (HDL) control-path model that specifies port attributes and associated stitching directives is generated. Each stitching directive specifies a control port and an associated one of the input ports of the HLL data-path model. The HLL data-path and HDL control-path models are linked (314) to create the timed hybrid simulation model, and the timed hybrid simulation model is stored in a processor-readable storage medium.

20 Claims, 4 Drawing Sheets

1

LINKING UNTIMED DATA-PATH AND TIMED CONTROL-PATH MODELS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the simulation of circuit designs, and more particularly to the generation of linked bit-accurate and cycle-accurate simulation models.

BACKGROUND

Due to advancements in processing technology, complex integrated circuits (ICs) can be designed using various levels of abstraction. Using a hardware description language (HDL), circuits can be designed at the gate level, the register transfer level (RTL), and higher logical levels. When designing using an HDL, the design is often structured in an object-oriented manner. The designer describes the behavior of a system in terms of signals that are generated and propagated through combinatorial modules from one set of registers to another set of registers. HDLs provide a rich set of constructs to describe the functionality of each module. Modules may be combined and augmented to form even higher-level modules.

System-level integration relies on reuse of previously created designs, from either within an enterprise or from a commercial provider. Libraries of pre-developed blocks of logic have been developed that can be included in an FPGA design. Such library modules include, for example, adders, multipliers, filters, and other arithmetic and DSP functions from which system designs can be readily constructed. The engineering community sometimes refers to these previously created designs as "design modules", "cores", or "IP" (intellectual property). The use of pre-developed logic cores permits faster design cycles by eliminating the redesign of circuits. Thus, using cores from a library may reduce design costs.

During the process of developing a circuit design, the behavior of the design is simulated based on a specification of the circuit design. Simulating the design helps to verify correct behavior prior to physical implementation of the circuit. Wasted manufacturing costs due to faulty design may thereby be avoided. Numerous tools are available for simulating circuit designs including, for example, high-level modeling systems (HLMS) and hardware description language (HDL) simulators.

In order to verify how a circuit design will behave when realized in hardware an HLMS simulation model, which is both bit-accurate and cycle-accurate, is used. Although it is possible for a block in an HLMS to have a model that is both bit- and cycle-accurate, it is often the case that a separate bit-accurate simulation model is necessary, because the implementation involves significant structural code that results in unacceptably slow simulation within the HLMS.

For example, an HLMS simulating digital signal processing (DSP) or digital communications applications could include blocks for finite impulse (FIR) and infinite impulse response (IIR) digital filters, fast Fourier transforms (FFTs), or error-correcting codecs. For high-level functions, providing a separate bit-accurate simulation model in a high-level language such as C++ may provide a faster simulation model.

To ameliorate the simulation requirements of design verification, many vendors provide timed behavioral models for most logic cores to improve simulation speeds of the design during verification and test aspects of design cycles. Internally, such models are used to ensure quality. However, creating timed behavioral models is time consuming and potentially difficult in cases of cores such as FFTs. With these types of cores, the computations involved slow down the simulation of the HDL behavioral model, which necessitates the use of a C/C++ model for verification. In other circumstances, C/C++ models of various DSP functions are readily available. However, the same cannot be said for HDL models of DSP-specific functionality. The C/C++ models, however, cannot be used alongside implementations of the core in a cycle-accurate simulation environment, because of the absence of timing information.

Current methods to integrate separate bit-accurate and cycle-accurate behavior models involve manual integration of a C-based bit-accurate model and an HDL-based cycle-accurate model using C/C++ for to implement an interface between the models to provide a cycle-accurate behavioral model. The C-based data-path model and HDL-based control-path model are integrated in a high-level modeling tool such as System Generator for DSP ("SysGen"). This manual process is error-prone and contributes to a sustained maintenance burden on developers. The control-path and data-path interfaces are not standardized to allow the use of this approach to other high-level cores without laborious manual intervention. Because of the manner in which the interface is created, simulation tools outside of the simulation tool used for integration cannot benefit from this technology.

The present invention may address one or more of the above issues.

SUMMARY

The embodiments of the present invention provide various approaches for creating a timed hybrid simulation model for a circuit design specification. In one embodiment, a method comprises inputting an untimed, high-level language (HLL) data-path model and inputting an HLL data-path interface specification that specifies input ports of the HLL data-path model. The method generates a hardware description language (HDL) control-path model that specifies port attributes and associated stitching directives. Each stitching directive specifies a control port and an associated one of the input ports of the HLL data-path model. The HLL data-path and HDL control-path models are linked to create the timed hybrid simulation model, and the timed hybrid simulation model is stored in a processor-readable storage medium.

In another embodiment, an article of manufacture is provided. The article of manufacture includes a computer-readable storage medium storing instructions for creating a timed hybrid simulation model for a circuit design specification. The instructions, when executed by one or more processors, cause the one or more processors to perform operations including inputting an untimed, high-level language (HLL) data-path model and inputting an HLL data-path interface specification that specifies input ports of the HLL data-path model. The operations further include generating a hardware description language (HDL) control-path model that specifies port attributes and associated stitching directives. Each stitching directive specifies a control port and an associated one of the input ports of the HLL data-path model. The HLL data-path and HDL control-path models are linked to create the timed hybrid simulation model, and the timed hybrid simulation model is stored in a processor-readable storage medium.

Another embodiment is a system for creating a timed hybrid simulation model for a circuit design specification. The system includes one or more processors and a memory arrangement coupled to the one or more processors. The memory arrangement stores instructions that when executed by the one or more processors cause the one or more processors to perform operations including inputting an untimed, high-level language (HLL) data-path model and inputting an HLL data-path interface specification that specifies input ports of the HLL data-path model. The operations further include generating a hardware description language (HDL) control-path model that specifies port attributes and associated stitching directives. Each stitching directive specifies a control port and an associated one of the input ports of the HLL data-path model. The HLL data-path and HDL control-path models are linked to create the timed hybrid simulation model, and the timed hybrid simulation model is stored in a processor-readable storage medium.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION

The present invention provides a method for linking an un-timed C++ data-path model with timing information encapsulated in an HDL control-path model to produce a timed hybrid model of a circuit design. The hybrid model enables a designer to perform bit- and cycle-accurate simulations of a circuit design incorporating high-level functions.

Figure 1:
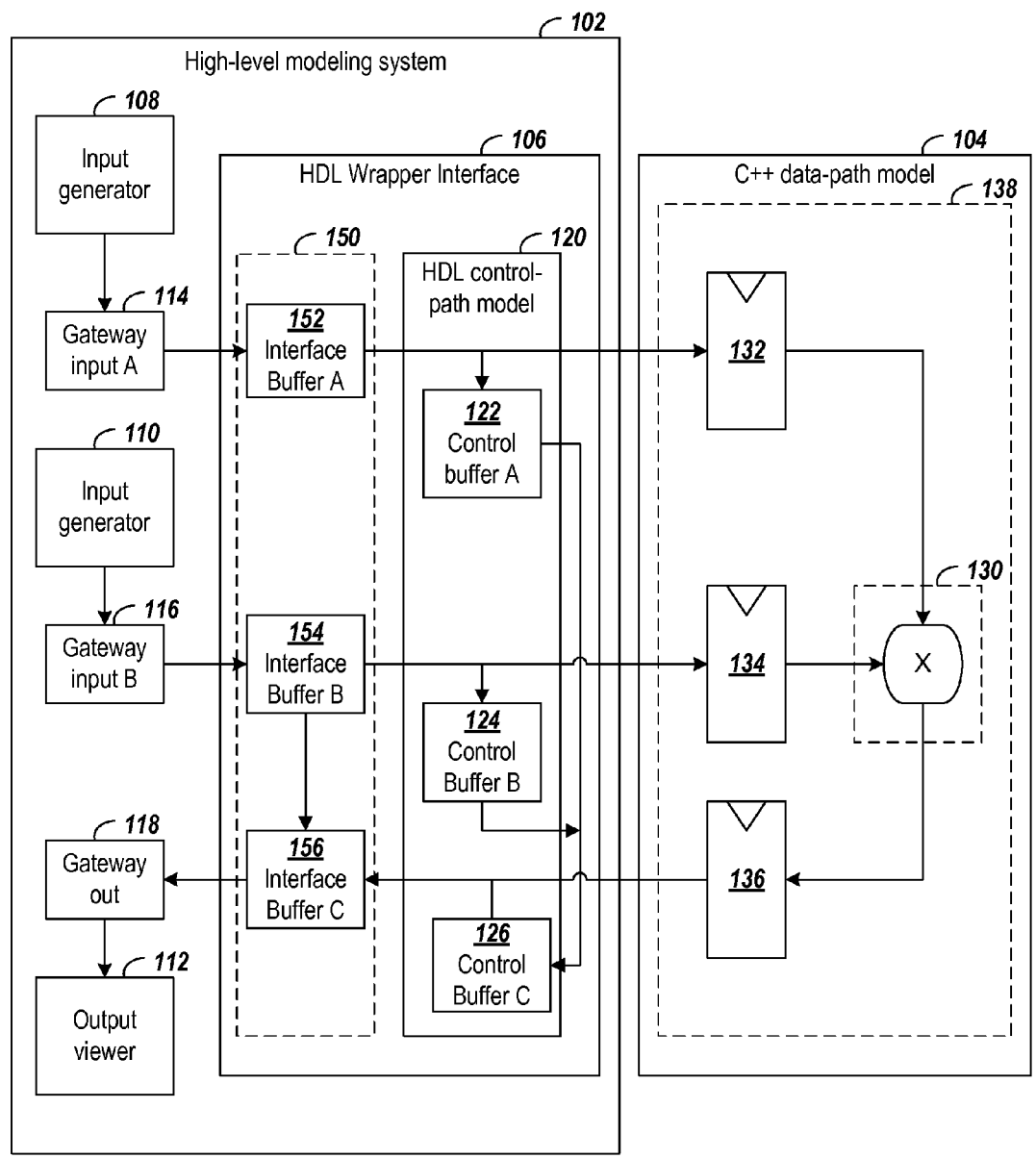
FIG. 1 shows a block diagram of an example hybrid simulation model constructed from data-path and control-path models of a multiplication module.

FIG. 1 is a block diagram of a simulation data flow between a simulator and example data-path and control-path models in a high-level modeling system (HLMS) 102. In this example, a hybrid model is created for a multiplication module 138. The HLMS 102 executes a simulation of multiply block module 138 using a bit and cycle-accurate hybrid simulation model. The hybrid simulation model includes HDL control-path model 120, which is encapsulated by HDL wrapper interface 106, along with external C++ data-path model 104. The contents of the multiply block 130 in the data-path model 104 and the control-path model 120 are not visible to the HLMS 102. Rather, the HLMS communicates solely with HDL wrapper interface 106.

A user of the HLMS 102 may graphically select and graphically connect the various components 104, 108, 110, 112, 114, 116, and 118 in the HLMS 102. Input generators 108 and 110 generate simulation input for the hybrid model, and output viewer 112 may be used to view the output from the hybrid model. The HLMS 102 may provide a wide variety of possible input generators 108 and 110, including those that provide, for example, a linear ramp, a sinusoid, or pseudo-random noise. The input generators may be selected by a user of the HLMS 102. Inputs and outputs are sent to and received from simulated modules through gateways 114, 116, and 118.

During simulation, the HDL wrapper interface code 150 and encapsulated control-path model 120 are executed within the HLMS 102. The control-path model 120 simulates the cycle-accurate timing behavior of simulated module 138, which includes the registers 132, 134, and 136, and the data-path model 104 simulates bit-accurate behavior. The HDL wrapper interface receives simulation input from the HLMS into interface buffers 150, which correspond to the generics used by the control-path and data-path models. HDL wrapper interface forwards simulation data received from gateway input A 114 and gateway input B 116 to the control-path model 120 and C++ data-path model 104, which is executed external from HLMS 102. Data-path model 104 simulates the bit-accurate output behavior of the simulated module 138 and returns the simulated output to the interface buffer 156 of HDL wrapper interface 106. The HDL wrapper interface delays the simulation output received from data-path model 104 for a number of simulation clock cycles according to the simulated timing behavior output received from the control-path model.

Figure 2:
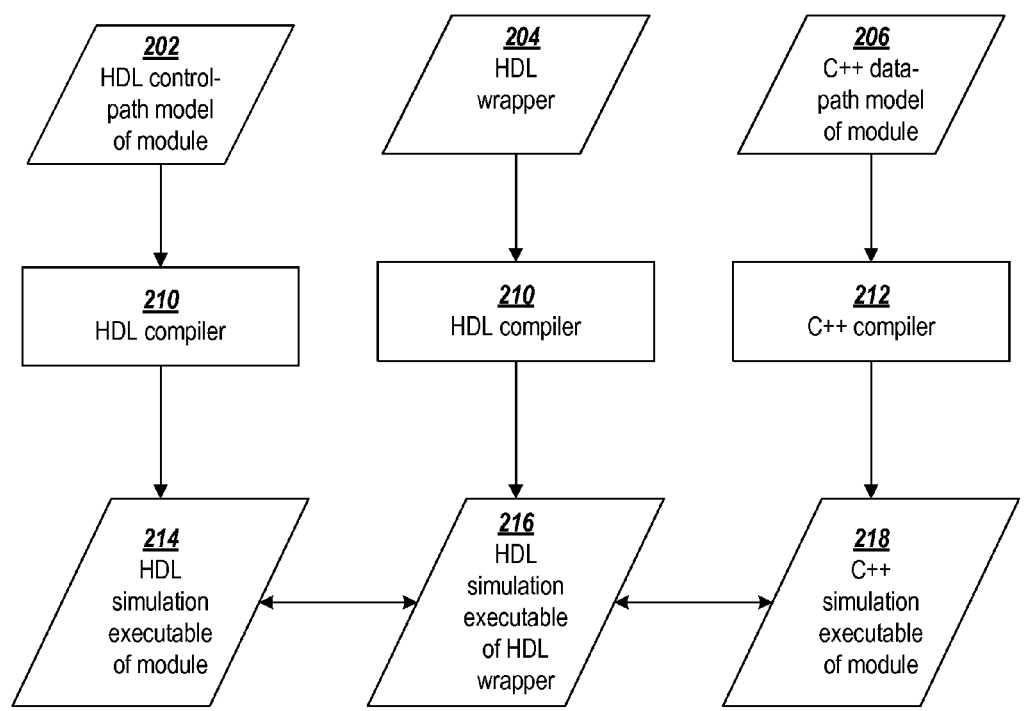
FIG. 2 shows a flow diagram showing the compilation of the data-path and control-path models along with the entire circuit design, and the relationship between the generated executables, in accordance with an embodiment of the invention.

FIG. 2 shows a compilation flow for the data-path and control-path models of a circuit design module, which is incorporated into a larger circuit design, and the relationship between the generated executables. Data-path model 206 is compiled with a C++ compiler 212 to generate and store data-path model executable 218. The control-path model 202 is encapsulated within HDL wrapper 204 and compiled with an HDL compiler 210 to produce and store executables 214 and 216 for the control-path model 202 and the HDL wrapper 204.

It will be appreciated that C++ data-path and HDL control-path models are generally not generated for an entire HDL design. Rather, both models are generated for a module which is incorporated in the overall HDL design and computationally intensive to simulate. In the example shown in FIG. 2, the data-path and control-path models are generated for a particular module of the HDL design. Like the control-path model, other modules of the design are compiled with an HDL compiler to produce a simulation executable (not shown). Generally, the HDL wrapper 204 and control-path model 202 would be incorporated with other modules of the HDL design into a single HDL file and compiled together to produce a single HLMS simulation executable.

During simulation, calls to the module simulated with the hybrid model are performed by calling the HDL wrapper executable 216. The HDL wrapper acts as an intermediary between the simulation and the data-path and control-path models. When input is received from the simulator, the HDL wrapper sends, receives, and forwards data according to the timing simulation data generated by the control-path model.

Figure 3:
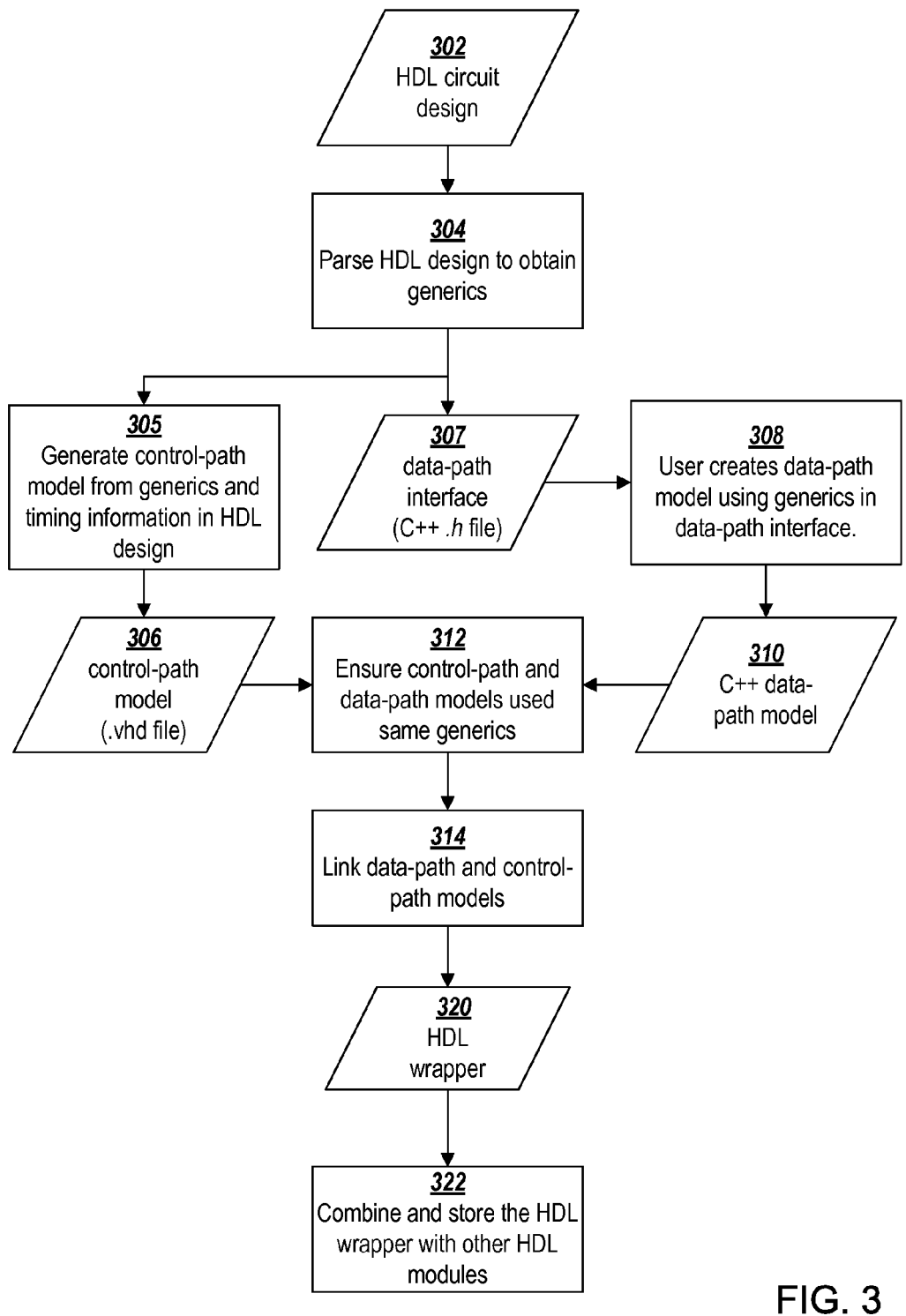
FIG. 3 shows a flowchart of a process for creating a compliant data-path model and linking the data-path and control-path models, in accordance with an embodiment of the invention.

FIG. 3 shows a flowchart of a process for generating and linking compliant control-path and data-path models to produce a hybrid model. An HDL circuit design description 302 is input and parsed to determine input/output generics and timing information at step 304. The determined generics are used to create a data-path interface C++ .h file 307. At step

308, the data-path interface file is used as a template by the designer to create a C++ data-path model 310 with the determined generics. The determined generics along with timing information obtained from the HDL design specification are used to generate a control-path model 306 at step 305.

After data-path model 310 and control-path model 306 are created, the models are parsed and compared at step 312 to ensure the same set of generics is used in both models. Data-path and control-path models are then linked at step 314 to produce an HDL wrapper 320. The HDL wrapper is combined with other modules of the HDL circuit design and stored at step 322. The wrapper is used as a simulation interface to send and receive bit-accurate data values to and from the C++ data-path model according to the timing constraints provided by the HDL control-path model.

Example 1, shown below, illustrates an example data-path interface C++ file, xfft_v6_0_datapath_model.h. The interface file may be automatically generated from a top-level design module. The top level module is parsed to create the interface file.

Implementation details are encapsulated in a separate data-path model implementation file, xfft_v6_0_datapath_model.c (not shown). The core developer organizes the data-path model against this interface to ease the process of stitching. The data-path model implementation file is created by the developer using the generated data-path interface as a C++ class template. The data-path model contains the data-path computation associated with a high-level core implemented in C or another programming language that can interface with C with a wrapper such as Java through JNI, Python through Boost.Python, etc.

Example 2 shows an example entity definition of a control-path model created in accordance with several embodiments of the invention. The control-path model of a design module is created by parsing HDL taken from the register transfer level (RTL) of the design module to be simulated to determine input-output generics and timing information.

The entity definition, in addition to defining port attributes, also specifies stitching directives using standard VHDL attributes specified on the ports. The X_INPUT_DATA_STITCHER attribute, in this example, is used to specify the memory model used by a control port in its interaction with input ports of an untimed data-path model to impose timing information.

The attribute is parsed as follows: "<MEMORY_TYPE>: <MEMORY_DEPTH>:<DATA_PORT_ID>"

MEMORY_TYPE may be one of the macros: FIFO, RAM, or REG. MEMORY_DEPTH is the depth of the memory. In the case where memory type is REG, the depth refers to register chain depth. DATA_PORT_ID indicates the name of the data port with which the control port interacts. Attributes such as X_OUTPUT_DATA_STITCHER may be similarly defined for output ports of the data-path model.

EXAMPLE 1

```
/* Copyright Xilinx, Inc., 2009 */
/* Contents of xfft_v6_0_datapath_model.h */
struct xfft_v6_0_generic_map {
    int* family;
    int* xdevicefamily;
    int* c_channels;
    int* c_nfft_max;
    int* c_arch;
    int* c_has_nfft;
    int* c_input_width;
    int* c_twiddle_width;
    int* c_output_width;
    int* c_has_ce;
    int* c_has_sclr;
    int* c_has_ovflo;
    int* c_has_scaling;
    int* c_has_bfp;
    int* c_has_rounding;
    int* c_data_mem_type;
    int* c_twiddle_mem_type;
    int* c_bram_stages;
    int* c_reorder_mem_type;
    int* c_has_natural_output;
    int* c_has_cyclic_prefix;
    int* c_optimize_goal;
    int* c_use_hybrid_ram;
    int* c_fast_cmpy;
    int *c_optimize;
    int* scale_sch_width;
    int* c_use_flt_pt;
};
void xfft_v6_0_datapath_model(
struct* xfft_v6_0_generic_map,
double* xn_re,
double* xn_im,
double* nfft,
double* fwd_inv,
double* scale_sch,
double* xk_re,
double* xk_im,
);
```

EXAMPLE 2

```
/* Copyright Xilinx, Inc., 2009 */
/* Entity declaration of control-path in
   xfft_v6_0_controlpath_model.vhd */
entity xfft_v6_0_controlpath_model is
  generic (
    family                  : integer := 0;
    xdevicefamily           : integer := 0;
    c_channels              : integer := 1;
    c_nfft_max              : integer := 6;
    c_arch                  : integer := 1;
    c_has_nfft              : integer := 1;
    c_input_width           : integer := 12;
    c_twiddle_width         : integer := 12;
    c_output_width          : integer := 12;
    c_has_ce                : integer := 1;
    c_has_sclr              : integer := 1;
    c_has_ovflo             : integer := 0;
    c_has_scaling           : integer := 0;
    c_has_bfp               : integer := 0;
    c_has_rounding          : integer := 0;
    c_data_mem_type         : integer := 1;
    c_twiddle_mem_type      : integer := 1;
    c_bram_stages           : integer := 0;
    c_reorder_mem_type      : integer := 1;
    c_has_natural_output    : integer := 0;
    c_has_cyclic_prefix     : integer := 0;
    c_optimize_goal         : integer := 0;
    c_use_hybrid_ram        : integer := 0;
    c_fast_cmpy             : integer := 0;
    c_optimize              : integer := 0;
    scale_sch_width         : integer := 6;
    c_use_flt_pt            : integer := 0);
  port (
    start         : in std_logic := '0';
    unload        : in std_logic := '0';
    nfft_we       : in std_logic := '0';
    fwd_inv_we    : in std_logic := '0';
    scale_sch_we  : in std_logic := '0';
    cp_len_we     : in std_logic;
    xn_index      : out std_logic_vector
                    (c_nfft_max-1 downto 0);
    xk_index      : out std_logic_vector
                    (c_nfft_max-1 downto 0);
    rfd           : out std_logic;
    busy          : out std_logic;
    vout          : out std_logic;
    edone         : out std_logic;
    done          : out std_logic;
    cpv           : out std_logic;
    rfs           : out std_logic;
    scale_sch_used : out std_logic_vector
```

EXAMPLE 2-continued

```
                        (scale_sch_width-1 downto 0);
    fwd_inv_used        : out std_logic;
    en                  : in std_logic;
    rst                 : in std_logic;
    clk                 : in std_logic;
    ce                  : in std_logic
);
attribute X_INPUT_DATA_STITCHER: string;
attribute X_OUTPUT_DATA_STITCHER : string;
attribute X_INPUT_DATA_STITCHER of nfft_we :
signal is "REG : 1 : nfft";
attribute X_INPUT_DATA_STITCHER of fwd_inv_we :
signal is "REG : 1 : fwd_inv";
attribute X_INPUT_DATA_STITCHER of fwd_inv_we : signal is
"REG : 1 : fwd_inv_used";
attribute X_INPUT_DATA_STITCHER of scale_sch_used : signal is
"REG : 1 : scale_inv_used";
attribute X_INPUT_DATA_STITCHER of rfd : signal is
"REG : c_nfft_max : xn_re";
attribute X_INPUT_DATA_STITCHER of ce : signal is
"REG : c_nfft_max : xn_re";
attribute X_INPUT_DATA_STITCHER of en : signal is
"REG : c_nfft_max : xn_re";
attribute X_INPUT_DATA_STITCHER of rfd : signal is
"REG : c_nfft_max : xn_im";
attribute X_INPUT_DATA_STITCHER of ce : signal is
"REG : c_nfft_max : xn_im";
attribute X_INPUT_DATA_STITCHER of en : signal is
"REG : c_nfft_max : xn_im";
attribute X_OUTPUT_DATA_STITCHER of xk_index : signal is
"RAM : c_nfft_max : xk_re";
attribute X_OUTPUT_DATA_STITCHER of xk_index : signal is
"RAM : c_nfft_max : xk_im";
end xfft_v6_0_controlpath_model;
```

In order for the simulated HDL model to send and receive data to and from the data-path C++ model, a C-to-HDL interface file must be created. Example C-to-HDL interface standards include VHPI, Verilog-PLI, and ModelSim-FLI.

To create the C-to-HDL interface, the data-path model interface and the control-path model are parsed to ensure parity between the control-path and data-path models described in HDL and C languages, respectively. ISim Fuse is an HDL Parsing tool that may be used to parse the control-path model and obtain the generics associated with the top-level entity. Gccxml is an open source C parser that may be used to parse the C++ data-path model interface. For example, Gccxml transforms C text into an XML based abstract syntax tree and extracts the fields of struct xfft_v6_0_generic_map as defined in xfft_v6_0_datapath_model.h, which is shown in Example 1.

ModelSim-FLI is used as an example for specifying this interface. The input is the generated data-path model interface, the created data-path model, and the control-path model. An FLI/VHPI/PLI interface is defined from the parser dump of xfft_v6_0_datapath_model.h. The input is the generated data-path model interface, the created data-path model, and the control-path model. The data-path model that the developer writes according to the data-path model interface is parsed to obtain the parameter signature and fields of the C struct of the data-path model and create a package file that is compliant with the C-to-HDL interface standard. Example 3 below shows an example package file that is compliant with ModelSim's FLI.

EXAMPLE 3

```
/* Copyright Xilinx, Inc., 2009 */
/* Contents of xfft_v6_0_datapath_model_pkg.vhd */
package xfft_v6_0_datapath_model_pkg is
    subtype DOUBLE is real;
```

EXAMPLE 3-continued

```
    type DOUBLEARRAY is array(natural range <>) of DOUBLE;
    procedure xfft_v6_0_datapath_model (
        xn_re           : IN is DOUBLEARRAY;
        xn_im           : IN is DOUBLEARRAY;
        nfft            : IN is DOUBLEARRAY;
        fwd_inv         : IN is DOUBLEARRAY;
        scalar_sch      : IN is DOUBLEARRAY;
        xk_re           : OUT is DOUBLEARRAY;
        xk_im           : OUT is DOUBLEARRAY
    );
    attribute foreign of xfft_v6_0_datapath_model : procedure is "
        xfft_v6_0_datapath_model_mti.dll";
end;
package body xfft_v6_0_datapath_model_pkg is
    procedure xfft_v6_0_datapath_model (
            --Specify Data-path Inputs
        xn_re           : IN is DOUBLEARRAY;
        xn_im           : IN is DOUBLEARRAY;
        nfft            : IN is DOUBLEARRAY;
        fwd_inv         : IN is DOUBLEARRAY;
        scalar_sch      : IN is DOUBLEARRAY;
            --Specify Data-path Generics
        family          : IN is INTEGER;
        xdevicefamily   : IN is INTEGER;
        c_channels      : IN is INTEGER;
        c_nfft_max      : IN is INTEGER;
        c_arch          : IN is INTEGER;
        c_has_nfft      : IN is INTEGER;
        c_input_width   : IN is INTEGER;
        c_twiddle_width : IN is INTEGER;
        c_output_width  : IN is INTEGER;
        c_has_ce        : IN is INTEGER;
        c_has_sclr      : IN is INTEGER;
        c_has_ovflo     : IN is INTEGER;
        c_has_scaling   : IN is INTEGER;
        c_has_bfp       : IN is INTEGER;
        c_has_rounding  : IN is INTEGER;
        c_data_mem_type : IN is INTEGER;
        c_twiddle_mem_type : IN is INTEGER;
        c_bram_stages   : IN is INTEGER;
        c_reorder_mem_type : IN is INTEGER;
        c_has_natural_output : IN is INTEGER;
        c_has_cyclic_prefix : IN is INTEGER;
        c_optimize_goal : IN is INTEGER;
        c_use_hybrid_ram : IN is INTEGER;
        c_fast_cmpy     : IN is INTEGER;
        c_optimize      : IN is INTEGER;
        scale_sch_width : IN is INTEGER;
        c_use_flt_pt    : IN is INTEGER;
            --Specify Outputs
        xk_re           : OUT is DOUBLEARRAY;
        xk_im           : OUT is DOUBLEARRAY
    ) is
    begin
        report "ERROR: foreign subprogram in_params not called";
    end;
end;
```

A C-to-HDL interface file for ModelSim FLI is then created to allow calling of the data-path model from HDL. An example FLI interface file for the data-path model interface is shown in Example 4.

EXAMPLE 4

```
/* Copyright Xilinx, Inc., 2009 */
/*Contents of xfft_v6_0_datapath_model_mti.c*/
#include <xfft_v6_0_datapath_model.h>
#include <mti.h>
double* unpack_mtiVariableIdT_to_double(mtiVariableIdT in)
{
double* out = (double *)mti_GetArrayVarValue(NULL, in);
return out;
}
void xfft_v6_0_datapath_model_mti(
mtiVariableIdT xn_re,
mtiVariableIdT xn_im,
```

EXAMPLE 4-continued

```
mtiVariableIdT nfft,
mtiVariableIdT fwd_inv,
mtiVariableIdT scalar_sch,
int* family                     ,
int* xdevicefamily              ,
     int* c_channels            ,
int* c_nfft_max                 ,
int* c_arch                     ,
int* c_has_nfft                 ,
int* c_input_width              ,
int* c_twiddle_width            ,
int* c_output_width             ,
int* c_has_ce                   ,
int* c_has_sclr                 ,
int* c_has_ovflo                ,
int* c_has_scaling              ,
int* c_has_bfp                  ,
int* c_has_rounding             ,
int* c_data_mem_type            ,
int* c_twiddle_mem_type         ,
int* c_bram_stages              ,
int* c_reorder_mem_type         ,
int* c_has_natural_output       ,
int* c_has_cyclic_prefix        ,
int* c_optimize_goal            ,
int* c_use_hybrid_ram           ,
int* c_fast_cmpy                ,
int* c_optimize                 ,
int* scale_sch_width            ,
int* c_use_flt_pt               ,
mtiVariableIdT xk_re            ,
mtiVariableIdT xk_im) {
//Setup Input and Output Pointers
double* xn_re_double = unpack_mtiVariableIdT_to_double(xn_re);
double* xn_im_double = unpack_mtiVariableIdT_to_double(xn_im);
double* xk_re_double = unpack_mtiVariableIdT_to_double(xk_re);
double* xk_im_double = unpack_mtiVariableIdT_to_double(xk_im);
double* nfft_double = unpack_mtiVariableIdT_to_double(nfft);
double* fwd_inv_double = unpack_mtiVariableIdT_to_double(fwd_inv);
double* scale_sch_double = unpack_mtiVariableIdT_to_double(scale_sch);
//Setup Data-path model parameters
struct xfft_v6_0_generic_map generics;
generics.family = family;
generics.xdevicefamily = xdevicefamily;
generics.c_channels = c_channels;
generics.c_nfft_max = c_nfft_max;
generics.c_arch = c_arch;
generics.c_has_nfft = c_has_nfft;
generics.c_input_width = c_input_width;
generics.c_twiddle_width = c_twiddle_width;
generics.c_output_width = c_output_width;
generics.c_has_ce = c_has_ce;
generics.c_has_sclr = c_has_sclr;
generics.c_has_ovflo = c_has_ovflo;
generics.c_has_scaling = c_has_scaling;
generics.c_has_bfp = c_has_bfp;
generics.c_has_rounding = c_has_rounding;
generics.c_data_mem_type = c_data_mem_type;
generics.c_twiddle_mem_type = c_twiddle_mem_type;
generics.c_bram_stages = c_bram_stages;
generics.c_reorder_mem_type = c_reorder_mem_type;
generics.c_has_natural_output = c_has_natural_output;
generics.c_has_cyclic_prefix = c_has_cyclic_prefix;
generics.c_optimize_goal = c_optimize_goal;
generics.c_use_hybrid_ram = c_use_hybrid_ram;
generics.c_fast_cmpy = c_fast_cmpy;
generics.c_optimize = c_optimize;
generics.scale_sch_width = scale_sch_width;
//Call the data-path model implementation function
xfft_v6_0_datapath_model(&generics, xn_re_double, xn_im_double,
xk_re_double, xk_im_double, nfft_double,
fwd_inv_double, scale_sch_double);
}
```

The data-path model and control-path models are then combined to create a stitched hybrid model. The HDL associated with the control-path model is parsed and the directives for each of the control signals are obtained. The attributes in the control-path model specify the data port with which the control signal is associated, along with the mechanism of data access to and from that control port. From this, an HDL wrapper is created to encapsulate the HDL control-path model. Example 5 shows an example of an HDL wrapper of stitched data-path and control-path models.

EXAMPLE 5

```
/* Copyright Xilinx, Inc., 2009 */
entity xfft_v6_0_model is generic (
  generic (
    family                : integer := 0;
    xdevicefamily         : integer := 0;
    c_channels            : integer := 1;
    c_nfft_max            : integer := 6;
    c_arch                : integer := 1;
    c_has_nfft            : integer := 1;
    c_input_width         : integer := 12;
    c_twiddle_width       : integer := 12;
    c_output_width        : integer := 12;
    c_has_ce              : integer := 1;
    c_has_sclr            : integer := 1;
    c_has_ovflo           : integer := 0;
    c_has_scaling         : integer := 0;
    c_has_bfp             : integer := 0;
    c_has_rounding        : integer := 0;
    c_data_mem_type       : integer := 1;
    c_twiddle_mem_type    : integer := 1;
    c_bram_stages         : integer := 0;
    c_reorder_mem_type    : integer := 1;
    c_has_natural_output  : integer := 0;
    c_has_cyclic_prefix   : integer := 0;
    c_optimize_goal       : integer := 0;
    c_use_hybrid_ram      : integer := 0;
    c_fast_cmpy           : integer := 0;
    c_optimize            : integer := 0;
    scale_sch_width       : integer := 6;
    c_use_flt_pt          : integer := 0);
  port (
    --Data Port---
    xn_re        : in std_logic_vector(c_input_width-1
                   downto 0);
    xn_im        : in std_logic_vector(c_input_width-1
                   downto 0);
    nfft         : in std_logic;
    fwd_inv      : in std_logic;
    scale_sch    : in std_logic;
    xk_re        : out std_logic_vector(c_input_width-1
                   downto 0);
    xk_im        : in std_logic_vector (c_output_width-1
                   downto 0);
    --Control Ports---
    start        : in std_logic := '0';
    unload       : in std_logic := '0';
    nfft_we      : in std_logic := '0';
    fwd_inv_we   : in std_logic := '0';
    scale_sch_we : in std_logic := '0';
    cp_len_we    : in std_logic;
    xn_index     : out std_logic_vector(c_nfft_max-1
                   downto 0);
    xk_index     : out std_logic_vector(c_nfft_max-1
                   downto 0);
    rfd          : out std_logic;
    busy         : out std_logic;
    vout         : out std_logic;
    edone        : out std_logic;
    done         : out std_logic;
    cpv          : out std_logic;
    rfs          : out std_logic;
    scale_sch_used : out std_logic_vector (scale_sch_width-1
                   downto 0);
    fwd_inv_used : out std_logic;
    en           : in std_logic;
    rst          : in std_logic;
    clk          : in std_logic;
    ce           : in std_logic
);
end xfft_v6_0_model;
          --Signals for Memory Models for accessing data-path
          signal xn_re_reg_file    : array(c_nfft_max-1) of real;
```

EXAMPLE 5-continued

```
        signal xn_im        : array(c_nfft_max-1) of real;
        signal xk_re        : array(c_nfft_max-1) of real;
        signal xk_im        : array(c_nfft_max-1) of real;
architecture behavioral of xfft_v6_0_model is
begin
--Writing to input memory for xn_re
process (ce, en, rfd, clk)
begin
        write_xn_re <= ce and en and rfd;
        if (clk'event and clk=1) then
            if (write_xn_re = 1) then
              for i in c_nfft_max-1 downto 1 loop
                xn_re_reg_file [i]= xn_re_reg_file [i-1];
              end loop;
              xn_re_reg_file[0] = std_logic_vector_to_real(xn_re);
            end if;
        end if;
end process;
--- Similarly for xn_im
process (ce, en, nfft, clk)
begin
        write_nfft <= ce and en and rfd;
        if (clk'event and clk=1) then
            if (write_xn_re = 1) then
              nfft_reg = std_logic_to_real(nfft);
            end if;
        end if;
end process;
--Similarly for fwd_inv. Scale_sch etc.
control_path_model_is :
entity work.xfft_v6_0_controlpath_model
generic map(
family => family,
xdevicefamily => xdevicefamily,
c_channels => c_channels,
c_nfft_max => c_nfft_max,
c_arch => c_arch,
c_use_nfft => c_has_nfft,
c_input_width => c_input_width,
c_twiddle_width => c_twiddle_width,
c_output_width => c_output_width,
c_has_ce => c_has_ce,
c_has_sclr => c_has_sclr,
c_has_ovflo => c_has_ovflo,
c_has_scaling => c_has_scaling,
c_has_bfp => c_has_bfp,
c_has_rounding => c_has_rounding,
c_data_mem_type => c_data_mem_type,
c_twiddle_mem_type => c_twiddle_mem_type,
c_bram_stages => c_bram_stages,
c_reorder_mem_type => c_reorder_mem_type,
c_has_natural_output => c_has_natural_output,
c_has_cyclic_prefix => c_has_cyclic_prefix,
c_optimize_goal => c_optimize_goal,
c_use_hybrid_ram => c_use_hybrid_ram,
c_fast_cmpy => c_fast_cmpy,
c_optimize => c_optimize,
scale_sch_width => scale_sch_width
)
port map(
    start => start,
    unload => unload,
    nfft_we => nfft_we,
    fwd_inv_we => fwd_inv_we,
    scale_sch_we => scale_sch_we,
    cp_len_we => cp_len_we,
    xn_index => xn_index,
    xk_index => xk_index,
    rfd => rfd,
    busy => busy,
    vout => vout,
    edone => edone,
    done => done,
    cpv => cpv,
    rfs => rfs,
    scale_sch_used => scale_sch_used,
    fwd_inv_used => fwd_inv_used,
    en => en,
    rst => rst,
    clk => clk,
```

EXAMPLE 5-continued

```
    ce => ce
)
process(xn_re_reg_file, xn_im_reg_file, nfft_reg,
scale_sch_reg, fwd_inv_reg)
begin
        xfft_v6_0_datapath_model(
        xn_re_reg _file,
        xn_im_reg_file,
        nfft_reg,
        scale_sch_reg,
        fwd_inv_reg,
        family,
        xdevicefamily,
        c_channels,
        c_nfft_max,
        c_arch,
        c_has_nfft,
        c_input_width,
        c_twiddle_width,
        c_output_width,
        c_has_ce,
        c_has_sclr,
        c_has_ovflo,
        c_has_scaling,
        c_has_bfp,
        c_has_rounding,
        c_data_mem_type,
        c_twiddle_mem_type,
        c_bram_stages,
        c_reorder_mem_type,
        c_has_natural_output,
        c_has_cyclic_prefix,
        c_optimize_goal,
        c_use_hybrid_ram,
        c_fast_cmpy,
        c_optimize,
        scale_sch_width,
        c_use_flt_pt,
        xk_re_reg_file,
        xk_im_reg_file
        );
end process;
process (xk_re_reg_file, xk_im_reg_file)
begin
    xk_re <= xk_re_reg_file[xk_index];
    xk_im <= xk_re_reg_file[xk_index];
end behavioral;
```

Figure 4:
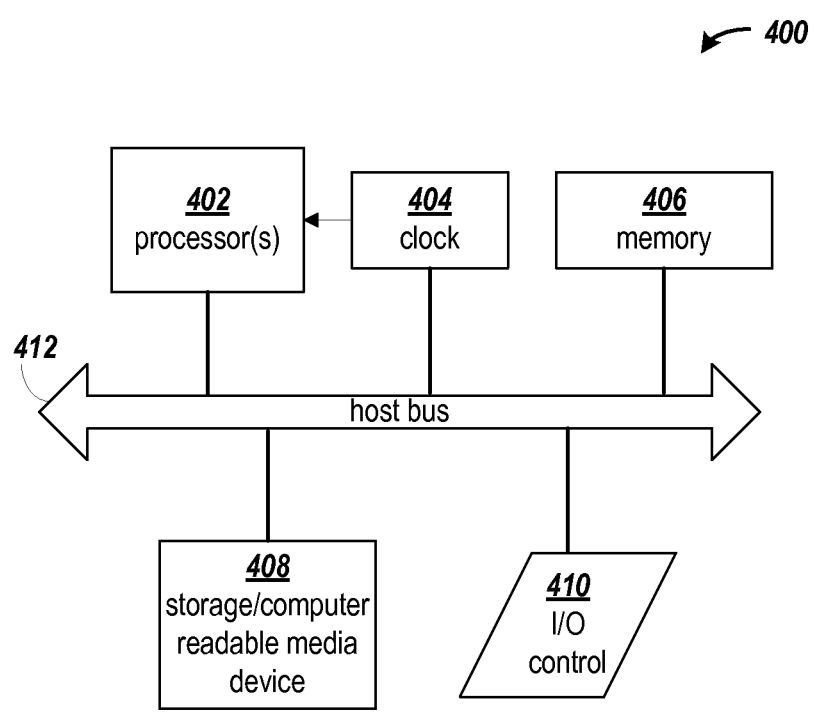
FIG. 4 shows a block diagram of a computing architecture that may be configured to perform the processes described herein.

FIG. 4 is a block diagram of an example computing arrangement on which the processes described herein may be implemented in accordance with various embodiments of the invention. Those skilled in the art will appreciate that various alternative computing arrangements, including one or more processors and a memory arrangement configured with program code, would be suitable for hosting the processes and data structures and implementing the algorithms of the different embodiments of the present invention. The computer code, implementing processes according to embodiments of the present invention, may be stored and provided via a variety of computer-readable storage media or delivery channels such as magnetic or optical disks or tapes, electronic storage devices, or as application services over a network.

Computing arrangement 400 includes one or more processors 402, a clock signal generator 404, a memory unit 406, a storage unit 408, and an input/output control unit 410 coupled to host bus 412. The arrangement 400 may be implemented with separate components on a circuit board or may be implemented as a system on a chip.

The architecture of the computing arrangement depends on implementation requirements as would be recognized by those skilled in the art. The processor 402 may includes one or more general purpose processors, or a combination of one or more general purpose processors and suitable co-processors, or one or more specialized processors (e.g., RISC, CISC, pipelined, etc.).

The memory arrangement 406 typically includes multiple levels of cache memory, a main memory. The storage arrangement 408 may include local and/or remote persistent storage such as provided by magnetic disks (not shown), flash, EPROM, or other non-volatile data storage. The storage unit may be read or read/write capable. Further, the memory 406 and storage 408 may be combined in a single arrangement.

The processor arrangement 402 executes the software in storage 408 and/or memory 406 arrangements, reads data from and stores data to the storage 408 and/or memory 406 arrangements, and communicates with external devices through the input/output control arrangement 410. These functions are synchronized by the clock signal generator 404. The resource of the computing arrangement may be managed by either an operating system (not shown), or a hardware control unit (not shown).

The present invention is thought to be applicable to a variety of systems for a data bus controller. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of creating a timed hybrid simulation model for a module of a circuit design specification, comprising:
   inputting an untimed, high-level language (HLL) data-path model of the module;
   inputting an HLL data-path interface specification that specifies input ports of the HLL data-path model;
   generating, by a programmed processor, a hardware description language (HDL) control-path model of the module that specifies port attributes and associated stitching directives, wherein each stitching directive specifies a control port and an associated one of the input ports of the HLL data-path model;
   wherein during simulation, behavior of the data-path model is bit-accurate, timing of the data-path model is not cycle-accurate, timing of the control-path model is cycle accurate, and simulation speed of the data-path model is faster than a cycle-accurate simulation of the module;
   linking the HLL data-path and HDL control-path models to create the timed hybrid simulation model including an HDL wrapper;
   wherein the HDL wrapper during simulation sends and receives bit-accurate data values to and from the data-path model according to timing constraints provided by the control-path model and delays simulation output from the data path model according to simulated timing behavior of the control-path model; and
   storing the timed hybrid simulation model in a processor-readable storage medium.

2. The method of claim 1, further comprising:
   generating the HLL data-path interface specification from the circuit design specification; and
   wherein the untimed HLL data-path model is created in compliance with the HLL data-path interface specification.

3. The method of claim 2, wherein generating the HLL data-path interface specification includes:
   parsing the circuit design specification;
   determining input port and output port generics; and
   organizing the input port and output port generics into a structure to create the HLL data-path interface specification.

4. The method of claim 1, wherein the linking includes:
   generating an HLL-to-HDL interface specification from the HDL control-path model, the HLL data-path interface specification, and the HLL data-path model; and
   creating the HDL wrapper from the generated HLL-to-HDL interface.

5. The method of claim 4, wherein the HDL wrapper is created from directives and attributes for each control signal in the control-path model.

6. The method of claim 5, wherein the attributes include a memory type, memory depth, and data port of each control signal.

7. The method of claim 4, wherein the HLL-to-HDL interface provides calling of the data-path model from an HDL simulation.

8. The method of claim 1, further comprising:
   parsing the generated HDL control-path model and the untimed HLL data-path model; and
   prior to the linking, verifying that the data-path model and control-path model contain equivalent sets of generics.

9. An article of manufacture, comprising:
   a non-transitory computer-readable storage medium storing instructions for creating a timed hybrid simulation model for a module of a circuit design specification, the instructions when executed by one or more processors causing the one or more processors to perform operations including:
   inputting an untimed, high-level language (HLL) data-path model of the module;
   inputting an HLL data-path interface specification that specifies input ports of the HLL data-path model;
   generating a hardware description language (HDL) control-path model of the module that specifies port attributes and associated stitching directives, wherein each stitching directive specifies a control port and an associated one of the input ports of the HLL data-path model;
   wherein during simulation, behavior of the data-path model is bit-accurate, timing of the data-path model is not cycle-accurate, timing of the control-path model is cycle accurate, and simulation speed of the data-path model is faster than a cycle-accurate simulation of the module;
   linking the HLL data-path and HDL control-path models to create the timed hybrid simulation model including an HDL wrapper;
   wherein the HDL wrapper during simulation sends and receives bit-accurate data values to and from the data-path model according to timing constraints provided by the control-path model and delays simulation output from the data path model according to simulated timing behavior of the control-path model; and
   storing the timed hybrid simulation model in a processor-readable storage medium.

10. The article of manufacture of claim 9, the operations further comprising:
    generating the HLL data-path interface specification from the circuit design specification; and
    wherein the untimed HLL data-path model is created in compliance with the HLL data-path interface specification.

11. The article of manufacture of claim 10, wherein generating the HLL data-path interface specification includes:
    parsing the circuit design specification;
    determining input port and output port generics; and organizing the input port and output port generics into a structure to create the HLL data-path interface specification.

12. The article of manufacture of claim 9, wherein the linking includes:
  generating an HLL-to-HDL interface specification from the HDL control-path model, the HLL data-path interface specification, and the HLL data-path model; and
  creating the HDL wrapper from the generated HLL-to-HDL interface.

13. The article of manufacture of claim 12, wherein the HDL wrapper is created from directives and attributes for each control signal in the control-path model.

14. The article of manufacture of claim 13, wherein the attributes include a memory type, memory depth, and data port of each control signal.

15. The article of manufacture of claim 9, the operations further comprising:
  parsing the generated HDL control-path model and the untimed HLL data-path model; and
  prior to the linking, verifying that the data-path model and control-path model contain equivalent sets of generics.

16. The article of manufacture of claim 12, wherein the HLL-to-HDL interface provides calling of the data-path model from an HDL simulation.

17. A system for creating a timed hybrid simulation model for a module of a circuit design specification, the system comprising:
  one or more processors;
  a memory arrangement coupled to the one or more processors, wherein the memory arrangement stores instructions that when executed by the one or more processors cause the one or more processors to perform operations including:
    inputting an untimed, high-level language (HLL) data-path model of the module;
    inputting an HLL data-path interface specification that specifies input ports of the HLL data-path model;
    generating a hardware description language (HDL) control-path model of the module that specifies port attributes and associated stitching directives, wherein each stitching directive specifies a control port and an associated one of the input ports of the HLL data-path model;
  wherein during simulation, behavior of the data-path model is bit-accurate, timing of the data-path model is not cycle-accurate, timing of the control-path model is cycle accurate, and simulation speed of the data-path model is faster than a cycle-accurate simulation of the module;
  linking the HLL data-path and HDL control-path models to create the timed hybrid simulation model including an HDL wrapper;
  wherein the HDL wrapper during simulation sends and receives bit-accurate data values to and from the data-path model according to timing constraints provided by the control-path model and delays simulation output from the data path model according to simulated timing behavior of the control-path model; and
  storing the timed hybrid simulation model in a processor-readable storage medium.

18. The system of claim 17, wherein the operations further comprise:
  generating the HLL data-path interface specification from the circuit design specification; and
  wherein the untimed HLL data-path model is created in compliance with the HLL data-path interface specification.

19. The system of claim 18, wherein generating the HLL data-path interface specification includes:
  parsing the circuit design specification;
  determining input port and output port generics; and
  organizing the input port and output port generics into a structure to create the HLL data-path interface specification.

20. The system of claim 17, wherein the linking includes:
  generating an HLL-to-HDL interface specification from the HDL control-path model, the HLL data-path interface specification, and the HLL data-path model; and
  creating the HDL wrapper from the generated HLL-to-HDL interface.

* * * * *